DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 423

T896,035

POLYMERIC SPECTRAL SENSITIZERS FOR LIGHT-SENSITIVE SILVER HALIDE GRAINS

Frederick J. Rauner and Paul B. Gilman, Jr., both of 1669 Lake Ave., Rochester, N.Y. 14650

Filed May 19, 1971, Ser. No. 145,008

Int. Cl. G03c *1/02, 1/08*

U.S. Cl. 96—114

No Drawing. 17 Pages Specification

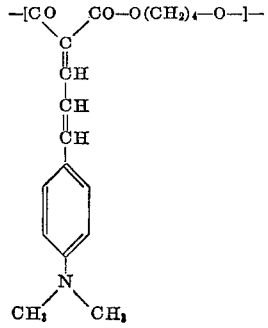

A light-sensitive composition comprising grains of silver halide and a polymer having chromophoric functional groups is disclosed. The polymer serves as a spectral sensitizer for the light-sensitive silver halide grains. In addition to its use as a spectral sensitizer, the polymer may also be used as a binder for the light-sensitive grains. In one embodiment utilizing the invention, there is provided a support upon which there is placed a photographic emulsion comprising light-sensitive silver halide grains and a polymer having repeating units of the formula: